March 13, 1951  E. B. DEWEY  2,545,265
COMBINED ROLLER AND HARROW
Filed Oct. 13, 1947  3 Sheets-Sheet 1
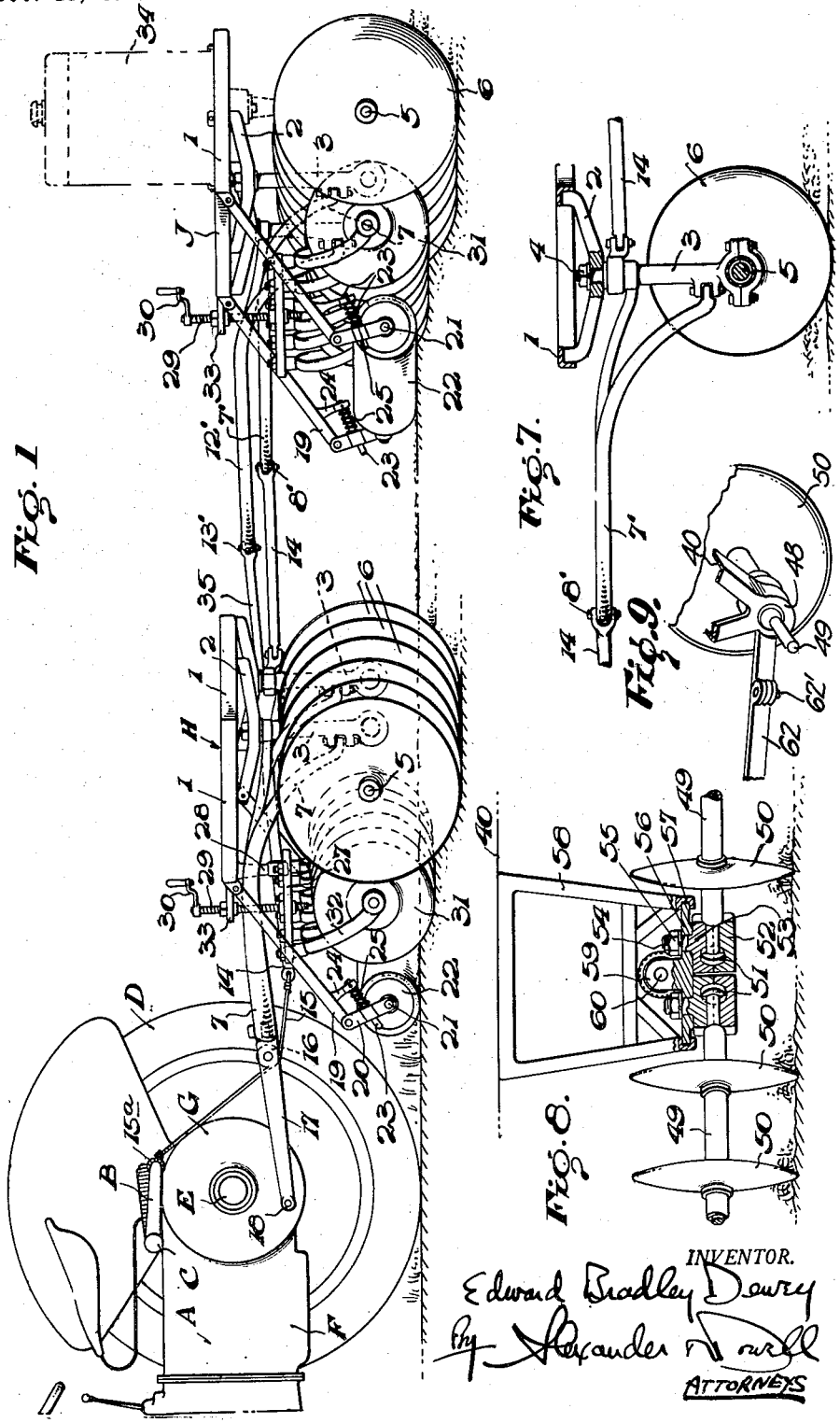
INVENTOR.
Edward Bradley Dewey
By Alexander Dowell
ATTORNEYS March 13, 1951  E. B. DEWEY  2,545,265
COMBINED ROLLER AND HARROW Filed Oct. 13, 1947  3 Sheets-Sheet 2

INVENTOR.
Edward Bradley Dewey
ATTORNEYS

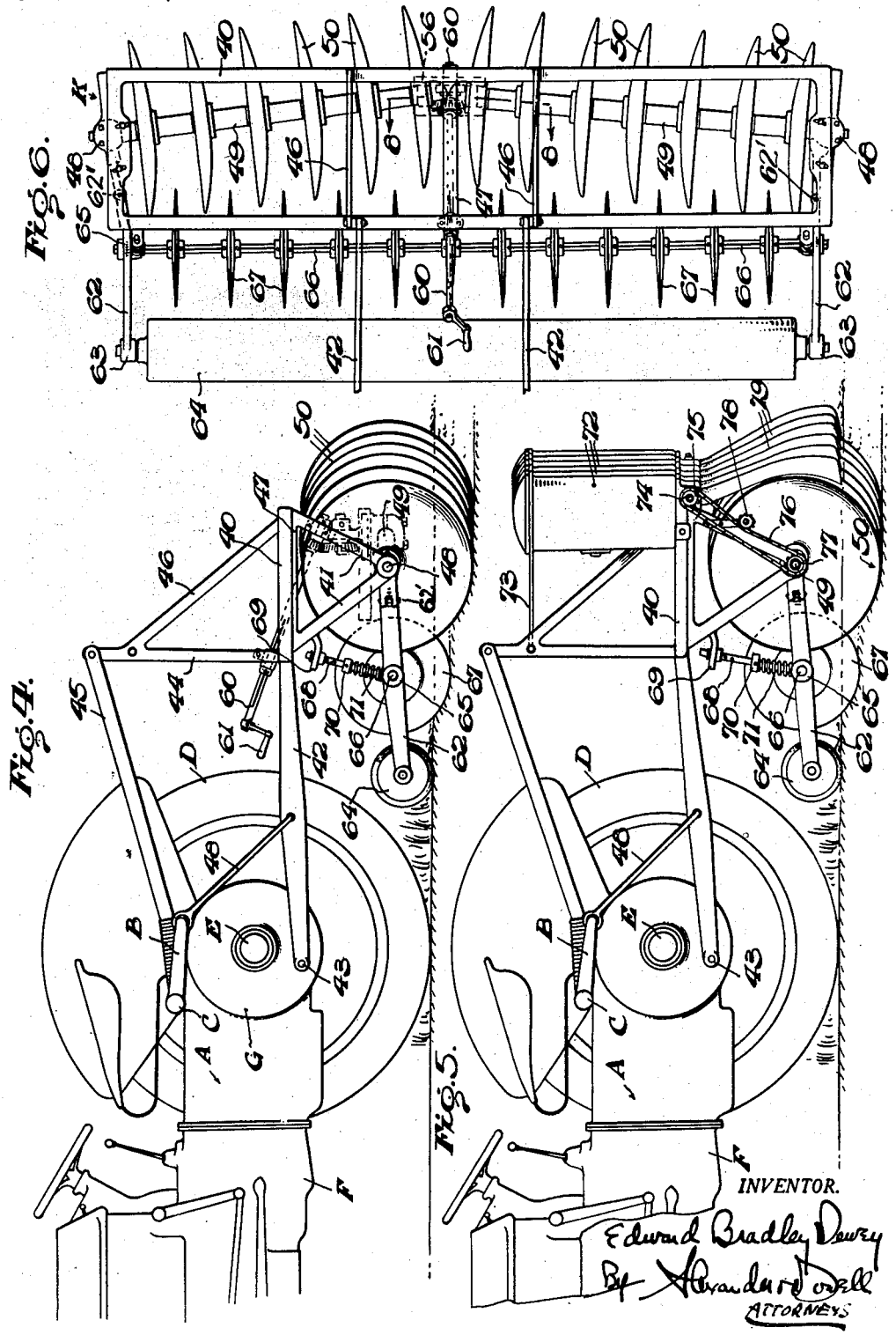

Patented Mar. 13, 1951

2,545,265

UNITED STATES PATENT OFFICE 2,545,265

COMBINED ROLLER AND HARROW

Edward Bradley Dewey, Washington, D. C.

Continuation of application Serial No. 520,940, February 3, 1944. This application October 13, 1947, Serial No. 779,571

4 Claims. (Cl. 55—12)

This invention is a novel agricultural machine and method adapted to take the place of the moldboard plow and disc harrow in preparing land for the planting of crops, and which in use will take full advantage of weeds, the prior year's stubble, and such vegetation as may be used as a green manure crop, for enriching the soil and at the same time stopping soil erosion.

The present application is a continuation of my copending application Serial No. 520,940, filed February 3, 1944 (now abandoned).

The main object of my invention is to provide an efficient machine for, and method of, preparing the ground for planting by simultaneously (1) rolling any trash, weeds, or green manure flat on the surface of the ground by means of a roller, (2) cutting same by means of a series of sharp cutting discs following directly behind the roller, and (3) turning the cut surface vegetation into the surface of the soil by means of a series of concavo-convex discs following directly behind the cutting discs and set at an angle to the direction of forward movement of the machine.

Another object of my invention is to provide a machine consisting of a series of rollers, cutting discs and concavo-convex discs mounted in a single frame or a series of frames connected together for the purpose hereinafter described, with provision for putting additional penetrational force on the discs by use of removable weights on the frame of the machine.

I have shown by the chart (in Fig. 3) what happens to the top-soil and sub-soil when the usual moldboard plow is used; and how same differs in operation and results as compared by the use of my invention. On the chart (Fig. 3) the letter A shows the position of plant life, top-soil and sub-soil. B shows how my invention operates to cut the plant life into the top-soil, thereby supplying food for the crops to be planted, and acting as a binder to hold the top-soil together and stop erosion without interrupting the capillary action that supplies moisture to the plants. C shows the results of using a moldboard plow for turning under and burying plant life so that same is out of each of the roots of the new crops, interrupting the capillary action that supplies moisture for new growth and drawing away surface moisture, leaving the top-soil in such a condition that erosion easily follows.

My invention used in preparing the soil for planting will give the following results as have been shown in the farmer's bulletins of the Department of Agriculture entitled "Stubble-Mulch Farming for Soil Defense (No. 1917)" and "Summer Crops for Green Manure and Soil Improvement (No. 1750)," and in "Plowman's Folly" by Edward Faulkner, published by the University of Oklahoma Press.

1. Halt erosion which is washing away our fertile lands into the rivers and seas.
2. Replenish the land where usefulness for farming is dying away.
3. Enrich the land that is already producing crops.
4. Produce more yield per acre.
5. Produce better crops and vegetables with more food value to the consumer.
6. Reduce crop damage by disease and parasites.
7. Reduce if not eliminate the need for commercial fertilizer.
8. Ease and simplify farm work in a time when labor is short.

Other objects and advantages of my invention will appear from the following description.

I will explain the invention with reference to the accompanying drawings which illustrate several practical embodiments thereof to enable others familiar with the art to adopt and use the same; and will summarize in the claims the essential features of the invention, the novel features of construction, and novel combinations of parts for which protection is desired.

In said drawings:

Fig. 1 is a side elevation of one form of my agricultural machine drawn by a tractor and showing in dotted lines removable water tanks on the frame to give additional penetrational pressure on the discs.

Fig. 4 is a side elevation of a modified agricultural machine carried by the rear end of a tractor.

Fig. 5 is a view similar to Fig. 4 but showing a further modification in which a grain drill is added.

Fig. 6 is a top plan view of the machine shown in Fig. 4.

Fig. 7 is an enlarged transverse sectional view on the line 7—7, Fig. 2.

Fig. 8 is an enlarged sectional view on the line 8—8, Fig. 6.

Fig. 9 is a fragmentary perspective view showing the hinge in the arm which supports the roll.

Figure 3:
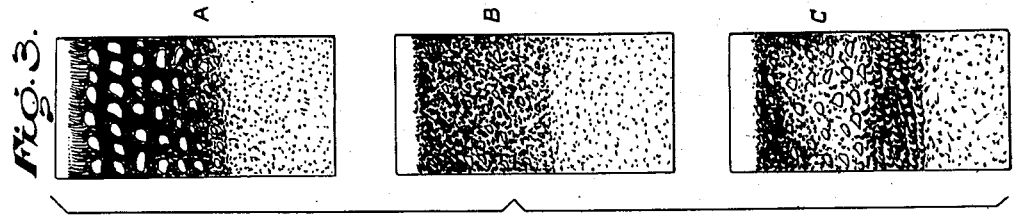
Fig. 3 is a diagrammatic cross-section through the top-soil and sub-soil of land showing (A) the trash and weeds on the surface; (B) the effect after use of my agricultural machine to cut the trash and weeds into the surface; and (C) the effect after use of a conventional moldboard plow to turn the trash and weeds under in the usual manner.
Figure 2:
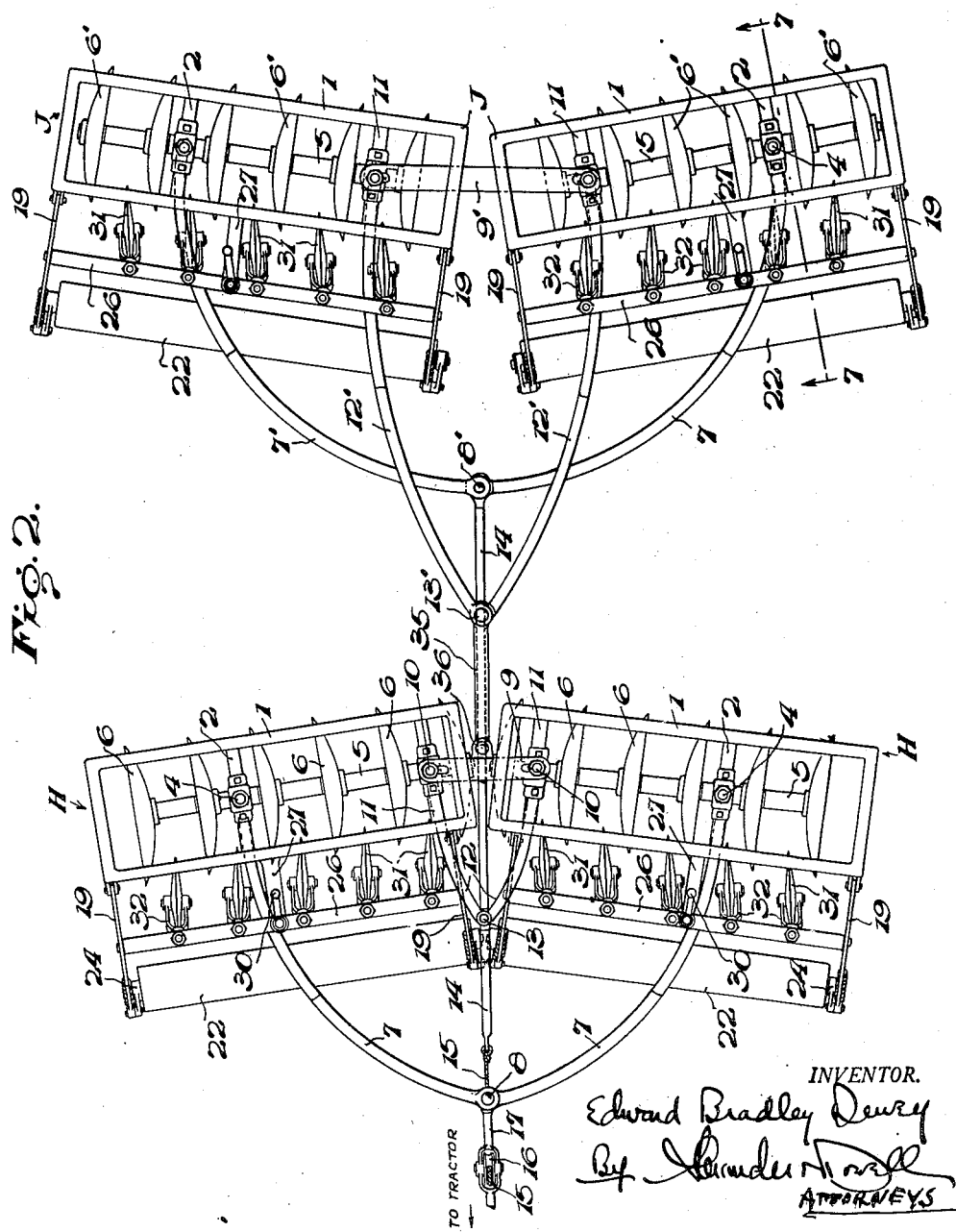
Fig. 2 is a top plan view of the machine shown in Fig. 1.

My agricultural machine is adapted to be either tractor drawn as in Figs. 1 and 2, or tractor supported, as in Figs. 4 and 5.

Figs. 1 and 2 illustrate the type in which the machine is tractor drawn. Tractor A is of commercial type provided with an hydraulic ram (not shown) and carries an arm B mounted on a horizontal pivot C and actuated by said hydraulic ram, the arm B being normally locked in the position to which it is set or adjusted by said ram. The tractor also includes rear wheels D mounted on axle sections E operated by a motor F through differential housing G in the usual manner. The particular construction of the tractor A however forms no part of my present invention.

The machine (Figs. 1 and 2) preferably comprises one or a series of pairs of parallel frames each carrying a roller, a series of cutting wheels, and a series of concavo-convex discs arranged as shown, in a leading unit H and a trailing unit J. The leading unit H preferably comprises a pair of substantially parallel rectangular frames 1 which are preferably of open type and provided with longitudinal members 2 (Figs. 2 and 7) intermediate their ends for posts 3 having threaded upper ends passing through holes therein at the centers of the members and retained by nuts 4, the lower ends of posts 3 carrying bearings for the axles 5 of the discs 6 which are preferably of concavo-convex type in the usual manner, the discs 6 being spaced along the axle 5 of each frame 1 which axles are disposed lengthwise of said frames.

Each post 3 of the pair carries a swivelled and bifurcated curved tongue 7 which are pivotally connected as at 8 on the axis of tractor A whereby the frames 1 may be swung from parallel relationship into angular relationship, a connecting bar 9 at the adjacent inner ends of the frames 1 being pivotally connected thereto as at 10, Fig. 2, the bolts 10 passing through frame members 11 in each frame similar to the members 2 above described. Thus the inner ends of the pair of frames 1 are pivotally connected by means of the connecting link 9, while the outer ends remain fixed, the inner ends being actuated as herein described to bring the frame sections into or out of alignment.

In order to actuate the pair of frames 1, tongues 12 are provided similar to the tongues 7, above described, but of shorter length, the same being pivoted together as at 13 on the axis of the tractor, said pivot pin 13 being carried by a link 14 having an eye in its outer end into which one end of a cable 15 is secured, the other end of the cable passing under a pulley 16 which is rotatably mounted on a pull bar 17, the front end of which is connected as at 18 to the differential housing G or other part of the tractor while its rear end carries the pivot pin 8 of tongues 7.

The opposite end of cable 15 is connected as at 15a to swinging lever B carried by the tractor, above described, so that as the lever B is raised from the position shown in Fig. 1 to a raised position, the cable 15 and link 14 and the tongues 12 will be pulled forwardly to bring the pair of frames 1 into alignment, while as above stated the tongues 7 will remain stationary. Thus, by adjusting the position of lever B of the tractor by means of the hydraulic ram, the amount of angularity of the discs 6 carried by the pairs of frames 1 may be adjusted to vary the cut performed by the concavo-convex discs 6 on the shafts 5 which may be adjusted from position of axial alignment in which the discs 6 will not cut but will merely roll along the ground. Instead of lever B, however, any other pulling means for cable 15 may be used.

On each frame 1 extending from the forward corners thereof are downwardly inclined arms 19 in the outer lower ends of which are journaled links 20 (Fig. 1), the outer ends of which carry journals for the shaft 21 of roller 22, which roller 22 is disposed parallel with the axis of its related frame 1, the roller being adapted to roll along the ground and mash or roll down any vegetable or other growth, rubbish, twigs, green manure, etc., which lies in its path.

Links 20 are yieldably urged downwardly by means of bolts 23 passing through bores in the links and disposed substantially parallel with the downwardly inclined arms 19, the upper ends of the bolts 23 being carried by lugs 24 depending from the undersides of the inclined arms 19. Around each bolt 23 between the lug 24 and link 20 is a coiled spring 25 normally urging the end of the link 20 to swing away from the lug 24 so as to maintain the roller 22 yieldably engaged with the ground surface.

Extending between the downwardly inclined arms 19 of each frame 1 is a rigid member 26 which is horizontally disposed and parallel with its related frame 1. At the approximate center of each member 26 is a horizontal member 27 having one end mounted upon the beam 26 and its other end secured to a downwardly depending post or lug 28 on the adjacent frame 1, the member 27 having a hinged connection with lug 28.

In order to forcibly depress the inclined arms 19 a screw shaft 29 is provided in a fixed nut 33 carried by the frame 1, said screw shaft having its lower end rotatably connected by a ball or other joint to the member 27, said screw shaft 29 carrying a crank 30 at its upper end, so that as the crank 30 is rotated in one direction the member 27 and arms 19 will be depressed, or will be raised when crank 30 is rotated in the opposite direction.

Spaced upon the member 26 of each frame 1, substantially opposite each of the discs 6, are sharpened cutting wheels 31, each cutting disc being mounted in a caster yoke 32 having its upper end swivelled in the fixed member 26 of the frame, so that raising and lowering the member 27 will correspondingly raise and lower the cutting wheels 31 with respect to the ground surface, and as the caster yokes are swivelled the discs 31 themselves will be drawn forwardly irrespective of the adjusted angularity of the frames, i. e., the angle of cut of the concavo-convex discs 6 as shown in Fig. 2. The vertical adjustment, however, of the cutting wheels 31 will not materially affect the downward pressure of the roll 22, owing to the provision of the springs 25 above mentioned.

By the above arrangement the frames 1 of the leading unit H may be adjusted for angularity to vary the characteristics of the cut of the discs 6 while the cutting wheels 31 may be adjusted as regards depth of cut by manipulating the hand cranks 30. However, the rollers 22 will be yieldably depressed with substantially constant pressure into contact with the ground surface.

In order to vary the downward pressure of the concavo-convex discs 6 with respect to the ground, tanks such as shown in dotted lines at 34 in Fig. 1 may be removably placed upon the tops of the frames 1 and filled with varying amounts of water or other liquid to adjust the weight; or the tanks may be removed and objects such as stones or the like placed upon the tops of the frames 1.

As shown in Figs. 1 and 2 the trailing unit J is similar in general to the leading unit H, and therefore like parts are similarly lettered. However, in the trailing unit J the discs 6' are faced in the opposite direction from those in the leading unit H but are positioned on the shafts 5 so as to be disposed midway between the discs 6 of the leading unit H. In the trailing unit J, when the frames 1 of the trailing unit J are set for cutting, the angularity between the pair of frames 1 thereof is equal to but opposite from the angularity of the pair of frames 1 of the leading unit H, as clearly indicated in Fig. 2.

In the trailing unit J, the tongues 7' are similar to the tongues 7 of the leading unit H, and are pivoted together as at 8' on the bar 14, previously described, so as to be operated simultaneously therewith, said tongues 7' of unit J being movable with the tongues 12 of the leading unit H. The fixed tongue 12' in the trailing section however meet on the axis of the tractor and are pivoted together as at 13' and the pivot carried by a link 35 pivotally connected as at 36 to the connecting bar 9 of the leading unit H. In the trailing section J a connecting bar 9', similar to bar 9 of the leading section H, pivotally connects the inner ends of the pair of frames 1 together.

By the above construction the inner ends of the pair of frames 1 of the leading unit H, and the outer ends of the pair of frames 1 of the trailing unit J are simultaneously movable by and with the draw bar 14, the arrangement being such that the pairs of frames of units H and J will simultaneously assume corresponding but opposite angularities with respect to the transverse axis of the tractor, as shown in Fig. 2.

The operation of the trailing unit J, except for the above mentioned differences, is similar in all respects to that of the leading unit above described, the concavo-convex discs 6 of the leading unit H cutting the surface from one angularity, and the oppositely facing concavo-convex discs 6' of the trailing unit J cutting the surface from the opposite direction, so as to disc the surface of the ground uniformly, but finely or coarsely as desired.

In the modification shown in Figs. 4, 6 and 8 the tractor A is similar in all respects to that previously described and its specific construction forms no part of my present invention, but in this modification a single unit K is supported and carried directly by the tractor A at the rear end thereof. The single unit K comprises an open frame 40 of rectangular shape and is provided with converging V-struts 41 at each end housing and carrying the outer bearings 49' for the shafts 49 of the discs 50 hereinafter described.

The front end of frame 40 is pivotally connected at opposite sides of the center line to spaced links 42 respectively pivotally connected to the rear end of the tractor, as at 43, said links serving to draw the frame 40 along the ground.

Pivoted to the outer end of each link 42 is an upright link 44 (Fig. 4) having its upper end pivotally connected with the rear end of an upper link 45, the forward end of which link 45 is also pivotally connected to the tractor above the pivots 43, the links 42—45 thereby serving as substantially parallel links. Extending downwardly and rearwardly from each upright link 44 adjacent its upper end is an inclined arm 46 which has its lower end connected as at 47 to the top of the rear end of the frame 40. In this modification, rods 48 each have one end attached to the swinging lever B of the tractor and its other end engaged with the lower parallel arm 42 intermediate its length, so that as the arm B is raised by the hydraulic ram the substantially parallel links 42—45 will be raised, thereby bodily lifting the entire unit above the ground surface while maintaining the frame 40 substantially parallel with the ground surface.

In the apex of each of the V-frames 41 at each end of frame 40 is a sliding and universal journal 48 for the related shaft section 49 upon which the related discs 50 are mounted, each shaft section 49 extending approximately one-half the width of the frame 40, and the discs on the pair of shaft sections 49 being faced in opposite directions, as shown in Fig. 6.

The inner ends of shaft sections 49 are swivelly connected together as shown more particularly in Fig. 8, the inner ends of the shafts 49 having enlarged disc-like heads 51 thereon which are embraced by split bearing members 52—53 having complementary bores respectively receiving the enlarged heads 51 and the adjacent ends of the shaft sections 49 as indicated in Fig. 8.

Each split bearing 52—53 is bolted or otherwise secured together to clamp same around the inner ends of the shaft sections 49, and each of the bearings 53 are provided with tapped studs 54 receiving nuts 55, the studs passing through holes in a sliding plate 56 arranged to slide axially of the tractor so that as the plate 56 is moved, the inner ends of the shaft sections 49 will be simultaneously shifted forwardly or rearwardly to bring the shaft sections 49 into or out of axial alignment.

Plate 56 is slidably mounted in guides 57 formed at the lower end of a sub-frame 58 secured to the underside of the frame 40 as shown in Fig. 8, and said plate is provided with tapped bearing 59 receiving a screw shaft 60 which is suitably journaled in the frames 40 and 58, and which carries a hand crank 61 at one end whereby rotation of the screw shaft 60 will move the nut 59, thereby pulling the sliding plate 56 back or forth to adjust the angularity of the shaft sections 49, the sliding bearings 48 at the opposite ends of the shaft sections 49 taking care of the lengthening and shortening of the sections 49 during such adjustment. Thus, the angularity of the pairs of oppositely inclined discs 50 at opposite sides of the sub-frame 58 may be adjusted by mere rotation of the hand crank 61 to adjust the characteristics of the cut effected by the discs 50.

In the modification (Figs. 4, 6 and 8) forwardly extending arms 62 are pivoted at each end of the frame 40 on the axle sections 49 adjacent the bearings 48, each arm 62 having a hinged joint 62' (Figs. 6 and 9) therein adjacent the bearing 48, the hinge pin thereof being substantially vertically disposed so as to permit the arm 62 to remain in its normal angularity with respect to the ground surface when the axle sections 49 are swung into different relative angularities; said arms 62 carrying at their outer ends bearings 63 for a single roller 64 which yieldably engages the ground in advance of the discs 50 as in the previously described modifications.

On the arms 62 intermediate their ends are bearings 65 for the shaft 66 of cutting wheels 67 which shaft 66 is disposed parallel with the frame 40. Wheels 67 are adapted to cut the stubble or other vegetation on the ground in advance of the concavo-convex discs 50 so as to prevent fouling of the latter. In order to yieldably depress the outer ends of arms 62, I provide bolts 68 having their upper ends locked in lugs 69 carried by the frame 40, said bolts 68 having thereon adjustable collars 70 and the lower ends of the bolts having a slotted sliding engagement with the shaft 66 of the cutting wheels 67.

On the bolts 68, between the collars 70 and shaft 66, are coiled springs 71 normally urging the shaft 66 downwardly to yieldably urge the cutters 67 into the ground and to yieldably maintain the roll 64 in contact with the ground surface.

By the above construction, when in operation, the entire assembly may be readily raised or lowered by merely manipulating the arm B of the tractor by the hydraulic ram to raise the arms 42—45 which support the frame 40, such raising being desirable particularly when turning the tractor around at the end of a cut or plowing operation, or when going to or from the work. By rotating the hand crank 61 the shaft sections 49 of the discs 50 may be adjusted to different angularities to control the characteristics of the cut, and as in the previously described modifications the roll 64 will roll down any stubble, or other vegetation which may be in the way of the cutting wheels 67 and the concavo-convex discs 50.

As shown in Fig. 5, in conjunction with the modifications shown in Figs. 1 and 4, grain drills may also be utilized, the same consisting of one or more grain hoppers 72 removably carried by the frame 40, the same resting at their lower ends on the rear portions of the frame 40, their upper ends being maintained by means of a stirrup or strap 73, as shown. The feed valves for the hopper are usually of the rotary type and may be simultaneously and readily operated from a valve shaft 74 carrying a sprocket 75, a chain 76 running over the sprocket 75 and under a sprocket 77 mounted on the outer end of the disc shaft 49 as indicated in Fig. 5, the chain tensioning roller 78 being positioned on the frame 40 and engaging the chain 76. Instead of using a chain, a belt or other desired drive may be substituted, the chain sprocket drive as shown merely illustrating one convenient means for driving the feed valve of the grain hopper 72 with the movement of the unit along the ground surface. The outlets of the valve chambers of the hopper 72 may be connected with flexible boots or tubes 79 discharging in rear of and adjacent to the bottom edge of the discs 50, as shown.

Thus, my invention provides various modifications of the agricultural machine adapted to disc an unplowed ground surface and at the same time cut the rubble stubble, green manure, etc., lying thereon, and simultaneously cut said rubble, etc. into the surface of the soil while opening furrows into its surface, and as a further modification providing means for planting seeds in the opened furrows. Obviously the feed hopper may be omitted and the units used merely to harrow or disc the surface, at the same time cutting the rubble thereinto, thereby preserving the fertilizing qualities of said rubble.

I do not limit my invention to the exact forms shown in the drawings, for obviously changes may be made therein within the scope of the claims.

I claim:

1. An agricultural machine, comprising a frame having depending struts at each end; means for pulling the frame; a pair of adjustable axle sections having their outer ends journaled in the struts and disposed substantially end to end transversely of the direction of pull; opposed series of spaced concavo-convex ground engaging discs carried by the axle sections respectively; means for shifting the axle sections into and out of axial alignment transversely of the direction of pull; forwardly extending arms pivoted at their rear ends on the outer ends of the axle sections; a shaft journaled in said arms in advance of the discs; a series of spaced cutting wheels carried by said shaft, said wheels being disposed parallel with the direction of pull; a roller journaled in said arms in advance of the cutting wheels for rolling the ground surface; and means for yieldably urging the said arms downwardly to maintain the roller and wheels in contact with the ground.

2. In a machine as set forth in claim 1, said struts carrying swingable bearings for said axle sections respectively; a plate on the frame intermediate the axle sections and shiftable in the direction of pull and carrying other swingable bearings receiving enlarged heads on the inner ends of the axle sections; and said axle shifting means comprising a screw shaft journaled in the frame and engaging a tapped bore in the plate.

3. In combination with a tractor having a power actuated lever; a frame supported by the tractor; means actuated by the tractor lever for raising and lowering the frame means; said frame having depending struts at each end carrying swingable bearings; a pair of axle sections below the frame disposed substantially end to end transversely of the tractor, the outer ends of the axle sections being mounted in said swingable bearings; a movable plate carried by the frame means and carrying other swingable bearings for the inner ends of the axle sections; means for shifting the plate to bring the axle sections into and out of axial alignment transversely of the axis of the tractor; opposed series of spaced concavo-convex ground engaging discs carried by the axle sections respectively; forwardly extending arms pivoted at their rear ends on the outer ends of the axle sections; a shaft journaled in said arms in advance of the discs; a series of spaced cutting wheels carried by said shaft, said wheels being disposed parallel with the longitudinal axis of the tractor; and means for yieldably urging the said arms downwardly to maintain said cutting wheels in contact with the ground.

4. In combination with a tractor having a power actuated lever; a frame supported by the tractor; means actuated by the tractor lever for raising and lowering the frame means; said frame means having depending struts at each end carrying swingable bearings; a pair of axle sections below the frame disposed substantially end to end transversely of the tractor, the outer ends of the axle sections being mounted in said swingable bearings; a movable plate carried by the frame and carrying other swingable bearings for the inner ends of the axle sections; means for shifting the plate to bring the axle sections into and out of axial alignment transversely of the axis of the tractor; opposed series of spaced concavo-convex ground engaging discs carried by the axle sections respectively; forwardly extending arms pivoted at their rear ends on the outer ends of the axle sections; a shaft journaled in said arms in advance of the discs; a series of spaced cutting wheels carried by said shaft, said wheels being disposed parallel with the longitudinal axis of the tractor; a roll journaled in the arms in advance of the cutting wheels for rolling the ground surface; and means for yieldably urging said arms downwardly to maintain the roll and cutting wheels in contact with the ground surface.

EDWARD BRADLEY DEWEY.

REFERENCES CITED

The following references are of record in the file of this patent:

UNITED STATES PATENTS

| Number | Name | Date |
|---|---|---|
| 289,258 | Helman | Nov. 27, 1883 |
| 677,140 | Owens | June 25, 1901 |
| 1,062,660 | Nugent | May 27, 1913 |
| 1,362,279 | Youmans | Dec. 14, 1920 |
| 1,611,358 | Miller | Dec. 21, 1926 |
| 1,626,572 | Wiese | Apr. 26, 1927 |
| 1,698,175 | Simpson | Jan. 8, 1929 |
| 1,762,258 | Chenoweth et al. | June 10, 1930 |
| 1,846,489 | Johnston | Feb. 23, 1932 |
| 1,926,976 | Engle | Sept. 12, 1933 |
| 2,320,624 | Love | June 1, 1943 |
| 2,336,152 | Rude | Dec. 7, 1943 |
| 2,336,848 | Cruse | Dec. 14, 1943 |
| 2,352,963 | McMahon | July 4, 1944 |
| 2,449,062 | Dewey | Sept. 14, 1948 |